United States Patent [19]

Gambetti

[11] Patent Number: 5,718,558
[45] Date of Patent: Feb. 17, 1998

[54] SYSTEM FOR VERTICALLY STACKING ROWS OF PRISMATIC OBJECTS

[75] Inventor: Mario Gambetti, Bologna, Italy

[73] Assignee: Baumer S.R.L., Castelfranco Emilia, Italy

[21] Appl. No.: 543,777

[22] Filed: Oct. 16, 1995

[30] Foreign Application Priority Data

Oct. 21, 1994 [IT] Italy ................... BO94A0465

[51] Int. Cl.⁶ .................................................. B65G 57/10
[52] U.S. Cl. ................ 414/790.3; 198/418.4; 414/791; 414/794.7
[58] Field of Search ................ 198/418.3, 418.4; 414/791, 790.3, 794.7

[56] References Cited

U.S. PATENT DOCUMENTS 2,815,848  12/1957  Jones ................... 198/418.4
3,352,435  11/1967  Reinecke .

FOREIGN PATENT DOCUMENTS 1 315 716  11/1960  France .
1 913 008  11/1970  Germany .
1 282 355   7/1972  United Kingdom .

*Primary Examiner*—Janice L. Krizek
*Attorney, Agent, or Firm*—Herbert Dubno

[57] ABSTRACT

A system for vertically stacking rows of parallelepedic objects includes a first conveyor adapted to arrange the objects in a first horizontal row on a first sliding table, at least a second conveyor adapted to arrange the objects in a second horizontal row on a second sliding table, disposed below the first sliding table so that this second row is below the first row, a thrust horizontal bar pusher for each row in the same direction and in reciprocal vertical alignment so that the upper row, when it passes beyond the downstream end of the first table falls into vertical alignment above the top of the lower row.

7 Claims, 5 Drawing Sheets

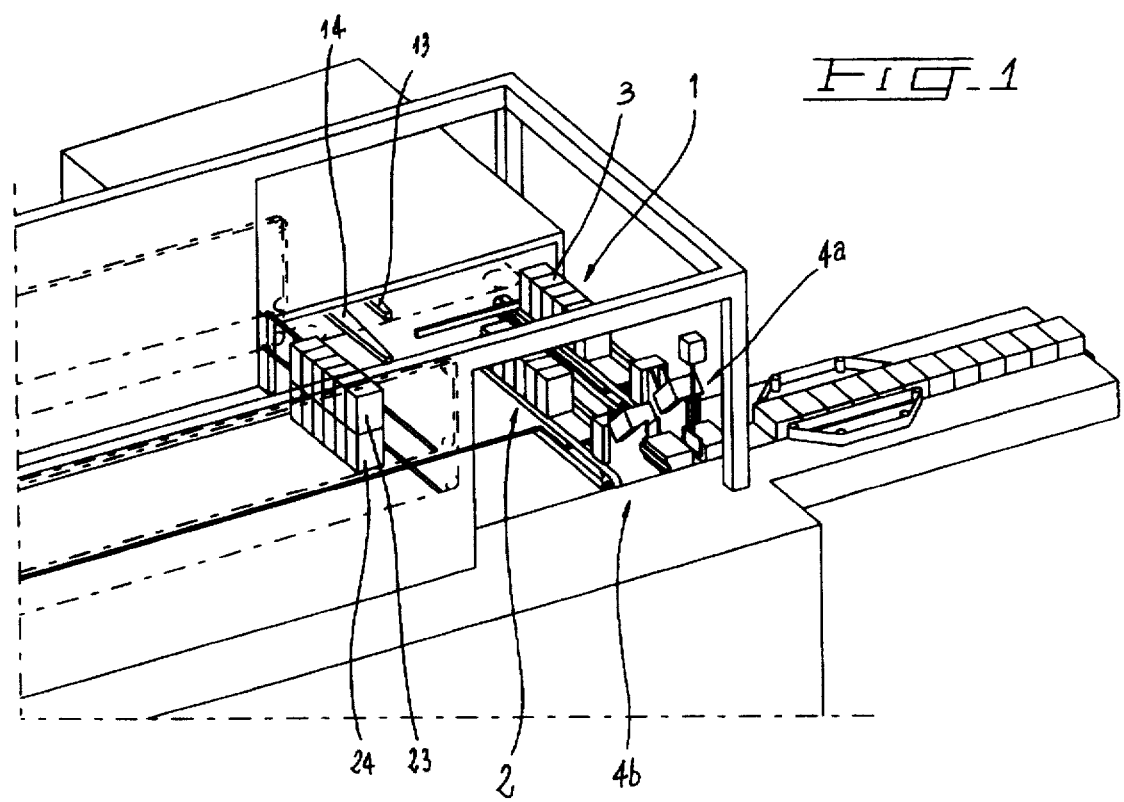

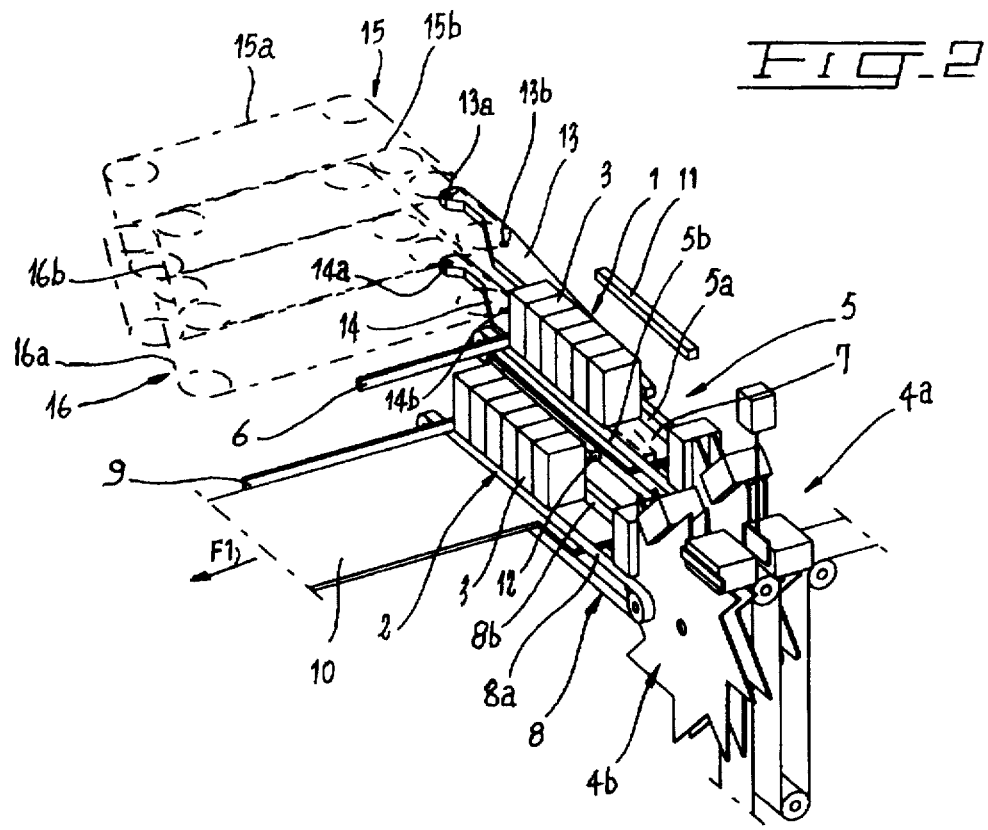
FIG_2
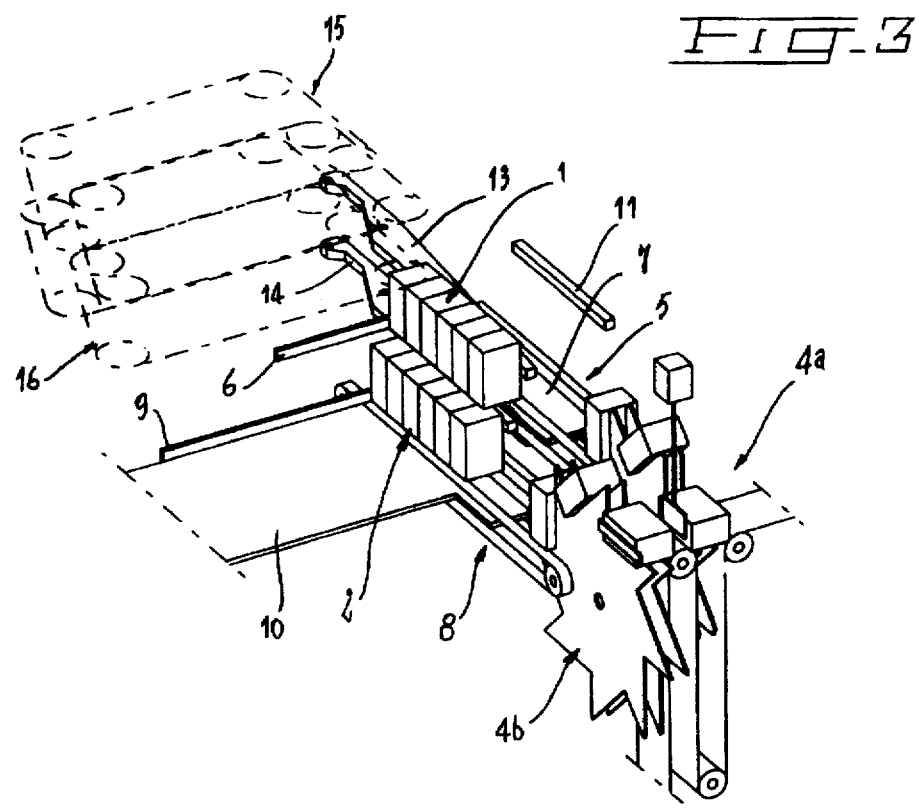
FIG_3

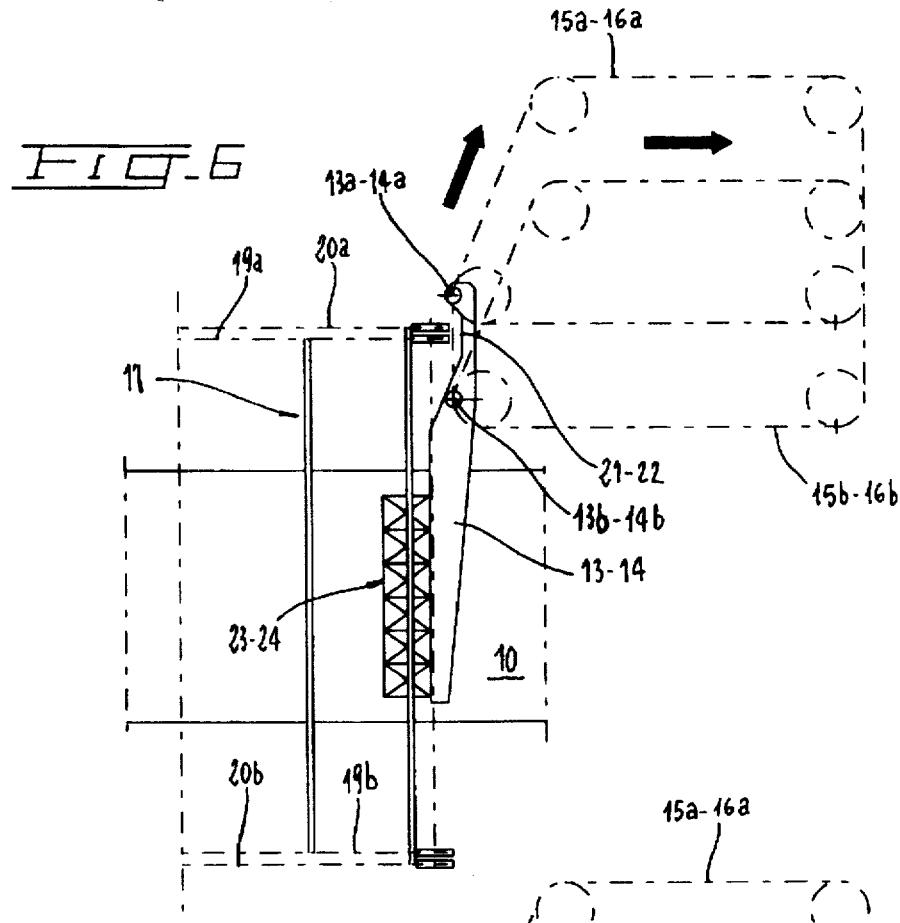
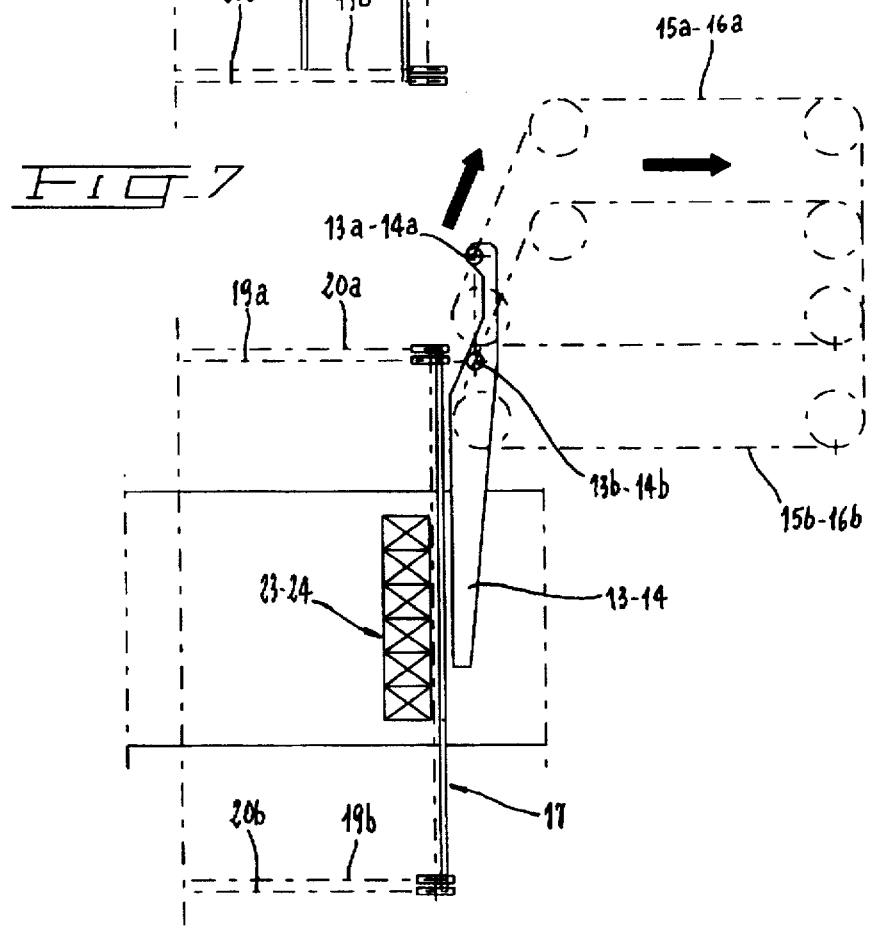

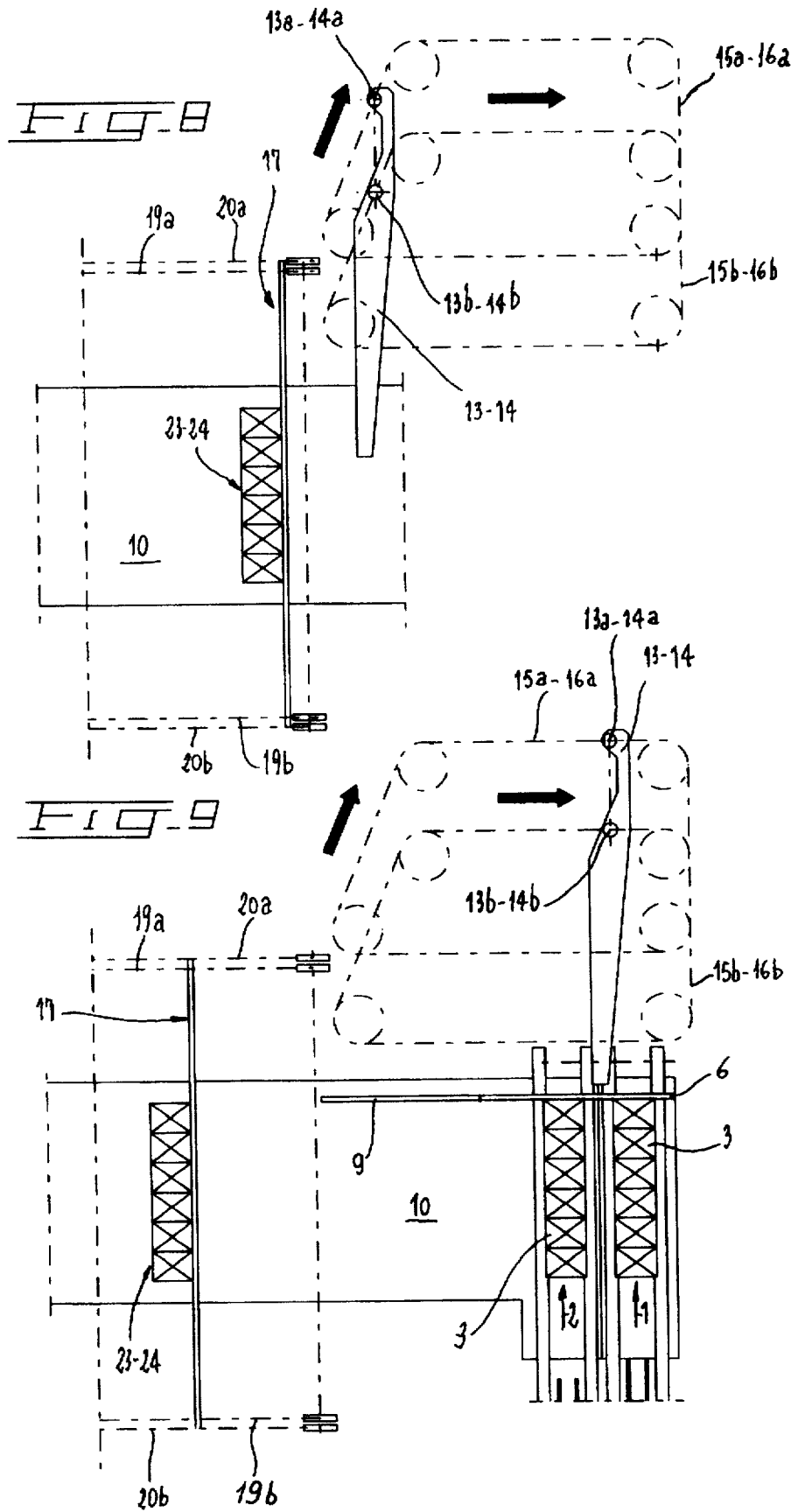

SYSTEM FOR VERTICALLY STACKING ROWS OF PRISMATIC OBJECTS

FIELD OF THE INVENTION

SPECIFICATION

The present invention relates to a system for vertically stacking rows of prismatic objects, for instance parallelepipedic packagings.

Various systems for stacking rows of parallelepipedic objects are currently known.

A known system substantially comprises a collection chamber into which the objects are supplied in order to form a first row and when the row is complete, the base of the chamber is lowered by a distance such as to form above this first row a second row of objects in vertical alignment with the row beneath it.

A further known system of the above-described type substantially comprises the formation of a first row of objects and, when the row is complete, the raising of this first row in order to enable the formation therebelow of a second row of objects in vertical alignment with this upper row so that this first row can then be superimposed on the second row.

These systems have a number of drawbacks. One of the drawbacks is due to the fact that the individual rows of objects to be superimposed have to be formed one after the other, thereby requiring considerable time.

A further drawback is due to the fact that costly and laborious devices for raising or lowering the individual rows are required.

A third drawback is due to the fact that if the length and/or width and/or height of the row to be stacked is varied, complicated and laborious adjustments of the collection chamber and the device for raising or lowering the rows are needed, requiring long working times for format adjustment and the use of costly and highly skilled labour.

A further drawback, in relation to the above drawback, is due to the fact that only a limited number of formats can be used.

OBJECT OF THE INVENTION

The object of the present invention is to provide a system for stacking rows of prismatic objects overcoming the drawbacks of the prior art.

SUMMARY OF THE INVENTION

The use of a system according to the invention achieves the following results: there is no need to form the rows to be stacked one after the other; there is no need to use devices for lowering the chamber or raising the rows of objects; changes of format of the objects do not require adjustments of the collection chamber and the raising or lowering devices.

The advantages achieved by the present invention lie substantially in that the various rows of objects to be stacked are formed simultaneously, in that collection chambers and devices for lowering or raising the rows to be stacked are not provided, in that format change operations are facilitated by computerising them and in that it is possible to work with a wide range of possible formats.

BRIEF DESCRIPTION OF THE DRAWING

The above and other objects, features, and advantages will become more readily apparent from the following description, reference being made to the accompanying drawing in which:

FIG. 1 is a perspective view of the system of the present invention included in a machine for packaging prismatic objects;

FIG. 2 is a perspective view of the system of the present invention during a first operating stage;

FIG. 3 is a view similar to FIG. 2 but in a subsequent operating stage;

FIG. 6 is a diagrammatic top view of the system of FIGS. 2 to 5, shown during a stage subsequent to that of FIG. 5;

FIG. 7 is a view similar to FIG. 6 in a subsequent operating stage; FIG. 8 is a view similar to FIG. 7 in a subsequent operating stage; FIG. 9 is a view similar to FIG. 7 in a subsequent stage.

SPECIFIC DESCRIPTION OF THE PREFERRED EMBODIMENT

Figure 4:
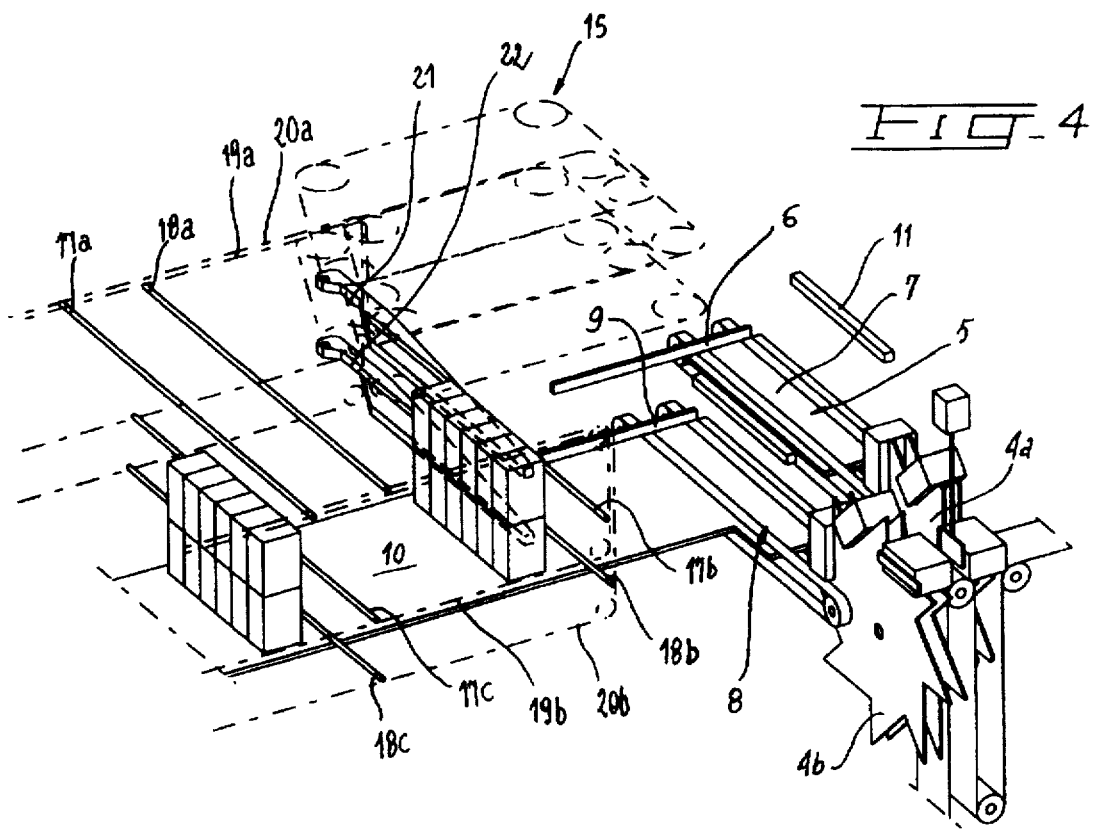
FIG. 4 is a view similar to FIG. 3 but in a subsequent operating stage.

FIG. 1 shows, by way of example, the system of the present invention for vertically stacking in reciprocal alignment two horizontal rows 1 and 2 of prismatic objects 3 supplied in an ordered and metered way by two supply devices 4a and 4b, disclosed in a separate application for a patent of industrial invention filed on the same date by the same applicants under number BO94 A000464.

With reference to FIG. 2 as well, the system of the present invention comprises a first conveyor 5, of the closed-loop type, comprising a pair of conveyor belts 5a and 5b which transport the objects 3 received from the first supply device 4a in the downstream direction of this conveyor 5, initially against a fixed stop member 6, then one against the other, in order to obtain the transverse row 1 of objects 3 disposed above a first sliding table 7, wherein this formation is monitored by a reader 11 which detects its upstream extension and/or correct disposition.

A second conveyor 8, similar to the conveyor 5 described above, is provided below the sliding table 7 and slightly downstream with respect to the direction of feed F1 of the machine and comprises two conveyor belts 8a and 8b which transport the objects 3 received from the second supply device 4b in the downstream direction of this conveyor 8, initially against a fixed stop member 9, then one against the other, in order to obtain the transverse row 2 of objects 3 disposed above a second sliding table 10, wherein this formation is monitored by a reader 12 which detects its upstream extension and/or correct disposition.

The two sliding tables 7 and 10 are spaced from one another by a height such that the top of the objects 3 of the second row 2 is disposed slightly below the lower end of the sliding table 7.

Two thrust bars 13 and 14 are provided beyond the downstream end of the two conveyors 5 and 8 and are supported to orbit, via respective actuator means 15 and 16, in two separate horizontal planes, wherein the bar 13 interacts with the first row 1 and the bar 14 with the second row 2.

Each actuator means 15 or 16, in order to move the individual bars 13 or 14, as shown in FIG. 6, comprises a pair of chains 15a, 15b or 16a, 16b, wherein each pair bears the end portion opposite the thrust end of a respective bar 13 or 14 hinged at 13a, 13b or 14a, 14b in a rotary manner.

With reference to FIG. 4, pairs of suspended thrust bars 17a–18a, 17b–18b, 17c–18c, etc., are provided longitudinally downstream of the packaging machine with respect to the conveyors 5 and 8 and are supported to orbit in a closed loop in a vertical plane, wherein the opposite ends of the bars 17 are connected to a pair of chains 19a and 19b wound in a closed loop in a vertical-longitudinal plane, and the bars 18 are similarly borne by a pair of chains 20a and 20b also wound in a closed loop in a vertical-longitudinal plane, and wherein the pair of chains 19a and 19b is disposed between the pair of chains 20a and 20b in order to prevent the bars 17 and 18 from interfering with one another when they move.

The operation of the above-described system for stacking prismatic objects initially comprises, as shown in FIG. 1, the formation of the individual transverse rows 1 and 2 of objects 3 above the sliding tables 7 and 10, which formation is monitored by the readers 11 and 12.

The projecting thrust bars 13 and 14, during these initial stages of formation of the rows 1 and 2 have, as will be explained below, removed the previously formed rows 23 and 24 from the zone of formation of the rows 1 and 2, as shown in FIG. 1, in order to enable the formation of these new rows 1 and 2.

When the readers 11 and 12 indicate that the desired quantity of objects for the rows 1 and 2 has been achieved and is correctly disposed, the thrust bar 13 starts to push the first row 1 of objects to be superimposed downstream, by causing them to slide on the sliding table 7.

When the first row 1 of objects 3 is in vertical alignment above the second row 2 of objects 3, the second bar 14 starts to push this second row 2, maintaining the vertical alignment between the rows 1 and 2, and when the first row 1 reaches the vicinity of the downstream end of the sliding table 7, the first row 1 falls onto the second row 2 in full reciprocal vertical alignment, as shown in FIG. 4.

The double row 1–2 is pushed further downstream by the two respective bars 13 and 14 until it reaches the upstream end of the operating trajectory of the suspended bar conveyors 17 and 18, wherein two bevels 21 and 22 provided in the bars 13 and 14 prevent these bars 13 and 14 from interfering with the chains 19a, 20a, as shown in FIGS. 4 and 6.

Figure 5:
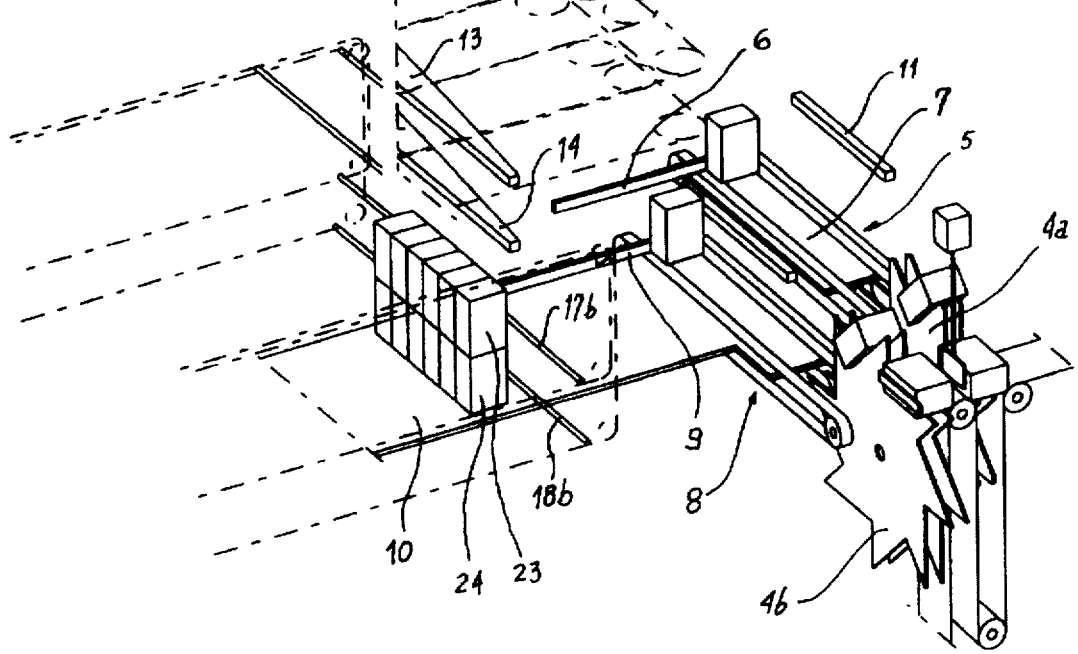
FIG. 5 is a view similar to FIG. 4 but in a subsequent operating stage.

When the double row 1–2 has been introduced into the operating trajectory of these two suspended bars 17 and 18, as shown in FIGS. 5 and 7, the projecting thrust bars 13 and 14 begin their return stroke downstream and towards the exterior of the sliding tables 7 and 10, as shown in FIGS. 8 and 9, in order to avoid interfering with the subsequent rows of objects being formed, so that they can then be positioned to the rear of the rows being formed, as shown in FIG. 2, in the case in which the formation of the rows is not yet complete, or to perform a new operating stroke in the case in which the rows are already complete.

This standby position of the thrust bars 13 and 14, when the horizontal row of objects is not yet formed, is obtained by monitoring the rows being formed by means of readers 11 and 12 and by a standby actuation device (not shown) associated with the actuator means 15 and 16.

The suspended bars 17 and 18, as they continue their operating stroke, convey the double row 1–2 downstream of the packaging machine with the two rows 1 and 2 in full vertical alignment, so that subsequent packaging operations, for instance boxing, wrapping or the like, can be carried out.

With reference to the technical and operational description given above, it should be noted that the movement of the operating members is synchronised by electronic and/or mechanical and/or computerised devices of a type well known to persons skilled in the art and not described in detail here because they lie outside the inventive concept of the present patent application.

With the system for stacking rows of prismatic objects as described above, when the projecting thrust bars 13 and 14 have cleared the zone of formation of the individual rows 1 and 2, it is possible immediately to begin the formation of the subsequent rows to be stacked and, by ensuring an appropriate ratio between speed and measurements, it is possible continuously to supply the objects 3 to the respective conveyors 5 and 7, since the clearing of the zone of formation of the rows may take place in the time interval between the supply of one object and another.

When it is necessary to carry out a format change to provide the rows with a different length and/or width, it is sufficient to re-program the electronic computer for the readers 11 and 12 and for the synchronisation of the handling members in relation to the new format, since the conveyors 5 and 8, the projecting thrust bars 13 and 14 and the suspended thrust bars 17 and 18 are adapted to work with different formats without requiring any mechanical adjustment.

When it is necessary to carry out a format change to provide the bottom row with a different height, it is sufficient simply to adjust the height of the sliding table 7 and, only in the case of major changes, to adjust the height of the projecting bars 13 and 14 and the suspended bars 17 and 18.

The system of the present invention may also be used for the vertical stacking of three or more rows of prismatic objects by providing a number of sliding tables with respective conveyors equivalent to the number of horizontal rows to be superimposed appropriately spaced from one another.

It should lastly be noted that, in the example described, the rows to be stacked are made up of successive individual objects, but that by providing two or more transverse conveyors similar to 5 and 8 described above spaced from one another on a same table and each supplied by respective supply devices similar to 4a and 4b described above, it is possible to form horizontal rows of objects to be superimposed made up of two or more individual adjacent rows, wherein each individual row may be made up of objects that are different from their coplanar counterparts, but substantially of the same height.

The description of the system for vertically stacking rows of objects is given purely by way of non-limiting example and it is therefore evident that all those modifications and/or variants coming within the scope of the following claims, which also form an integral part of this description, suggested by practice and/or by its embodiment or use may be made thereto.

I claim:

1. An assembly for vertically stacking at least two longitudinal rows of parallelepipedic objects to be stacked, the assembly comprising:

first conveying means for delivering a first plurality of objects in one direction to form a first row of the objects on a first sliding table extending in an upper horizontal plane, second conveying means for delivering a second plurality of objects in said one direction to form a second row of objects on a second sliding table extending in a lower horizontal plane offset from the upper plane in a second direction perpendicular to said one direction; and pusher means including at least two displaceable thrust bars juxtaposed with respective first and second sliding tables in respective initial positions of the bars for displacing said first and second rows of the objects in said second direction during a stack stroke of the thrust bars, said bars being vertically aligned during said stack stroke, and being orbitally displaceable in respective horizontal planes back to the respective initial positions of the thrust bars during a return stroke thereof.

2. The assembly defined in claim 1 wherein said first and second conveying means each comprises a respective double belt conveyor.

3. The assembly defined in claim 1 further comprising another pair of thrust bars having respective horizontal thrust paths overlapping thrust paths of the first and second thrust bars during a stack stroke.

4. The assembly defined in claim 3 further comprising actuating means for displacing the other pair of thrust bars and including a respective pair of endless chains, each of said first and second thrust bars being formed with bevel means for uninterrupted work of the respective pair of the chains of the other pair of the trust bars.

5. The assembly defined in claim 1 further comprising actuating means for displacing and aligning during said stack stroke said first and second thrust bars.

6. The assembly defined in claim 5 wherein said actuating means includes first and second endless chains and wherein a respective one of the first and second thrust bars is hinged to said first and second endless chains at two points.

7. The assembly defined in claim 5 further comprising sensor means for monitoring a length of each of the first and second rows of the objects, and control means operatively connected with said sensor means for stopping said actuating means in said initial position of the first and second bars and for starting said actuating means upon attainment of a predetermined length of the rows of objects as detected by said sensor means.

* * * * *